United States Patent
Körner et al.

(10) Patent No.: US 9,311,218 B2
(45) Date of Patent: Apr. 12, 2016

(54) METHOD AND APPARATUS FOR THE DETERMINATION OF A QUALITY ASSESSMENT OF A SOFTWARE CODE WITH DETERMINATION OF THE ASSESSMENT COVERAGE

(75) Inventors: Christian Körner, Bergen (DE); Matthias Saft, Olching (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 89 days.

(21) Appl. No.: 13/884,328

(22) PCT Filed: Sep. 29, 2011

(86) PCT No.: PCT/EP2011/067012
§ 371 (c)(1),
(2), (4) Date: May 9, 2013

(87) PCT Pub. No.: WO2012/062513
PCT Pub. Date: May 18, 2012

(65) Prior Publication Data
US 2013/0232472 A1 Sep. 5, 2013

(30) Foreign Application Priority Data

Nov. 9, 2010 (DE) .......................... 10 2010 043 623
Mar. 28, 2011 (DE) .......................... 10 2011 006 215

(51) Int. Cl.
*G06F 9/44* (2006.01)
*G06F 11/36* (2006.01)

(52) U.S. Cl.
CPC .............. *G06F 11/3616* (2013.01); *G06F 8/77* (2013.01)

(58) Field of Classification Search
None
See application file for complete search history.

(56) References Cited

U.S. PATENT DOCUMENTS

| | | | | |
|---|---|---|---|---|
| 6,701,519 B1* | 3/2004 | Cowan | ............... | G06F 11/3672 714/E11.207 |
| 7,243,337 B1* | 7/2007 | Cowan | ............... | G06F 11/3672 714/E11.207 |
| 7,617,415 B1* | 11/2009 | Kadakia | ............. | G06F 11/3676 714/26 |
| 7,917,897 B2* | 3/2011 | Bassin et al. | .................. | 717/131 |
| 8,312,433 B2* | 11/2012 | Ben-Yehuda | ....... | G06F 11/3676 712/228 |
| 8,381,194 B2* | 2/2013 | Wang | ................... | G06F 11/3676 714/38.1 |
| 8,423,960 B2* | 4/2013 | Farchi | ................. | G06F 11/3676 717/101 |
| 8,448,141 B2* | 5/2013 | Blount | ..................... | G06F 8/70 714/33 |
| 8,495,583 B2* | 7/2013 | Bassin | .................. | G06F 11/008 717/124 |
| 8,499,353 B2* | 7/2013 | Lockhart et al. | ................ | 726/25 |
| 8,527,965 B2* | 9/2013 | Cifuentes et al. | ............. | 717/131 |
| 8,561,021 B2* | 10/2013 | Muharsky | ........... | G06F 11/3672 717/113 |

(Continued)

OTHER PUBLICATIONS

Ayewah et al., Evaluating Satic Analysis Defect Warnings on Production Software, published by ACM, 2007, pp. 1-7.*

(Continued)

*Primary Examiner* — Tuan Q. Dam
*Assistant Examiner* — Zheng Wei
(74) *Attorney, Agent, or Firm* — Slayden Grubert Beard PLLC

(57) ABSTRACT

In a method for determining a quality assessment of a software code, the coverage is concomitantly calculated when determining the assessment. In order to increase the coverage, additional measurement results and assessments may be taken into account. Following changes to the software base, it is determined which of the additional measurements and assessment results should be renewed in order to provide or ensure the defined coverage.

10 Claims, 4 Drawing Sheets

(56) References Cited

U.S. PATENT DOCUMENTS

| | | | | |
|---|---|---|---|---|
| 8,561,030 B2* | 10/2013 | Trainin | | G06F 9/526 717/124 |
| 8,561,031 B2* | 10/2013 | Trainin | | G06F 9/526 717/124 |
| 8,607,198 B2* | 12/2013 | Nir-Buchbinder et al. | ... | 717/124 |
| 8,627,287 B2* | 1/2014 | Fanning et al. | | 717/124 |
| 8,645,921 B2* | 2/2014 | Bassin | | G06F 11/008 717/127 |
| 8,756,569 B2* | 6/2014 | Arcese | | G06F 11/3676 717/124 |
| 8,869,116 B2* | 10/2014 | Fliek | | G06F 11/3672 714/31 |
| 8,954,936 B2* | 2/2015 | Bnayahu | | G06F 8/10 717/128 |
| 2005/0210452 A1* | 9/2005 | Dimpsey | | G06F 11/3466 717/120 |
| 2005/0223354 A1* | 10/2005 | Drissi et al. | | 717/114 |
| 2006/0225051 A1* | 10/2006 | Kannan | | G06F 9/542 717/129 |
| 2007/0234309 A1* | 10/2007 | Davia | | G06F 11/3644 717/130 |
| 2008/0209567 A1* | 8/2008 | Lockhart et al. | | 726/25 |
| 2009/0055804 A1* | 2/2009 | Blaschek et al. | | 717/126 |
| 2009/0113400 A1* | 4/2009 | Pelleg | | G06F 11/3466 717/130 |
| 2009/0144698 A1* | 6/2009 | Fanning et al. | | 717/120 |
| 2009/0158259 A1* | 6/2009 | Arcese | | G06F 11/3688 717/131 |
| 2009/0249298 A1* | 10/2009 | Blount | | G06F 8/70 717/125 |
| 2009/0249299 A1* | 10/2009 | Farchi | | G06F 11/3676 717/125 |
| 2009/0259989 A1* | 10/2009 | Cifuentes et al. | | 717/110 |
| 2010/0023928 A1* | 1/2010 | Hentschel et al. | | 717/124 |
| 2010/0153926 A1* | 6/2010 | Ben-Yehuda | | G06F 11/3676 717/127 |
| 2010/0262866 A1* | 10/2010 | Nir-Buchbinder et al. | | 714/38 |
| 2011/0047531 A1* | 2/2011 | Wang | | G06F 11/3676 717/130 |
| 2011/0055798 A1* | 3/2011 | Kraft et al. | | 717/100 |
| 2011/0067005 A1* | 3/2011 | Bassin | | G06F 11/008 717/127 |
| 2011/0197176 A1* | 8/2011 | Muharsky | | G06F 11/3676 717/113 |
| 2011/0271253 A1* | 11/2011 | Bnayahu | | G06F 8/10 717/123 |
| 2012/0272220 A1* | 10/2012 | Calcagno et al. | | 717/125 |
| 2013/0067436 A1* | 3/2013 | Bnayahu | | G06F 8/10 717/123 |
| 2014/0123110 A1* | 5/2014 | Wan et al. | | 717/124 |
| 2014/0165045 A1* | 6/2014 | Calcagno et al. | | 717/125 |

OTHER PUBLICATIONS

Richter, Dieter, "Software Quality Assurance in Metrology," ISA Transactions, vol. 33, No. 4, 8 pages, Dec. 1, 1994.

Nagappan, Nachiappan et al., "Static Analysis Tools as Early Indicators of Pre-Release Defect Density," Software Engineering, Proceedings of the 27th International ICSE Conference, IEEE, 7 pages, May 15, 2005.

International Search Report and Written Opinion, Application No. PCT/EP2011/067012, 16 pages, Nov. 17, 2011.

* cited by examiner

METHOD AND APPARATUS FOR THE DETERMINATION OF A QUALITY ASSESSMENT OF A SOFTWARE CODE WITH DETERMINATION OF THE ASSESSMENT COVERAGE

CROSS-REFERENCE TO RELATED APPLICATIONS

This application is a U.S. National Stage Application of International Application No. PCT/EP2011/067012 filed Sep. 29, 2011, which designates the United States of America, and claims priority to DE Patent Application No. 10 2010 043 623.2 filed Nov. 9, 2010 and DE Patent Application No. 10 2011 006 215.7 filed Mar. 28, 2011. The contents of which are hereby incorporated by reference in their entirety.

TECHNICAL FIELD

The present disclosure relates to a method and an apparatus for the determination of a quality assessment of a software code with determination of the assessment coverage.

BACKGROUND

Checking the quality of software entails both a high effort in terms of time and also an associated high effort in terms of cost. In particular, with a manual quality assessment it is frequently impossible to determine reliable, reproducible and/or constructive suggestions for the improvement of the software quality within a framework that is acceptable in terms of both time and money.

The information on the quality of software codes obtained by pure benchmark solutions based on metrics or static code analyses is of limited use only. Generally, only lists of metrics with details of threshold crossings or a quantity of rule infringements are generated. A manual analysis and/or assessment of these results is sometimes just as complex as the quality analysis of the software code itself.

There is frequently a desire to obtain weighted information for proposed improvements to a software code, which, depending on the effort, costs and expected potential for improvement, enable measures for improvement to be prioritized in order to achieve a desired quality level under pre-specified project aims or to approximate them as closely as possible within the limits of the available budget.

There is a requirement for a quality analysis for software codes, wherein the results of the quality analysis should enable conclusions to be drawn regarding the aspect or assessment coverage. At the same time, a quality analysis should simultaneously suggest procedures as to how the assessment coverage can be increased under predetermined framework conditions, possibly by means of manual quality analysis.

In this context, the assessment must include other aspects in addition to those aspects of the quality analysis for software codes which can be measured by automated means.

SUMMARY

One embodiment provides a method for determining a quality assessment of a software code and the assessment coverage with the steps: performance of a static code analysis of the software code with the aid of predetermined rule and/or metric definitions and outputting of identified rule infringements and/or object dimensions, which include results of the metrics for software objects; assessment of the identified rule infringements and/or object dimensions based on predetermined assessment functions and the outputting of assessed rule infringements; aggregation of the assessed rule infringements based on a predetermined quality aspect hierarchy and outputting of a quality-aspect-related quality assessment of the software code; and determination of a quality-aspect-related assessment coverage factor based on a predetermined aggregation function and normalization of the identified quality-aspect-related quality assessment to the identified assessment coverage factor for outputting an assessment coverage of the quality-aspect-related quality assessment.

In a further embodiment, the method further comprises outputting a multi-quality-aspect-encompassing quality assessment of the software code based on the aggregated assessed rule infringements.

In a further embodiment, the method further comprises assessment of an effort required for the rectification of the assessed rule infringements based on predetermined rule properties and the identified object dimensions; and outputting effort-assessed corrective actions.

In a further embodiment, the method further comprises sorting the effort-assessed corrective actions according to the amount of effort required and/or severity of the rule infringement; and outputting a group of effort-assessed corrective actions based on predetermined target-achievement data.

In a further embodiment, the outputting of assessed rule infringements includes the outputting of assessed rule infringements by software code objects that have changed in comparison with already quality-assessed software code objects.

In a further embodiment, the method further comprises determination of quality-assessment tasks, which are to be performed manually, based on the assessment coverage of the quality-aspect-related quality assessment; and outputting an updated assessment coverage taking into account the assessment effort for the identified quality-assessment tasks.

In a further embodiment, in the step of the determination of quality-assessment tasks the only quality-assessment tasks to be taken into account are those which are to be performed on software code objects that have changed in comparison with software code objects already quality-assessed in a previous method.

Another embodiment provides an apparatus for determining an assessment coverage of a quality assessment of a software code with: a database mechanism, which is embodied to store, predetermined rule and/or metric definitions, predetermined assessment functions, predetermined quality aspect hierarchies, predetermined aggregation functions and predetermined rule properties for a plurality of software codes; an analyzer mechanism, which is embodied to perform a static code analysis of the software code with the aid of predetermined rule and/or metric definitions from the database mechanism and output identified rule infringements and/or object dimensions, which include results of the metrics for software objects; an evaluation mechanism, which is embodied to assess the identified rule infringements and/or object dimensions based on predetermined assessment functions from the database mechanism and output assessed rule infringements; an aggregation mechanism, which is embodied to aggregate the assessed rule infringements based on a predetermined quality aspect hierarchy from the database mechanism and to output a quality-aspect-related quality assessment of the software code; and a normalization mechanism, which is embodied to determine a quality-aspect-related assessment coverage factor based on a predetermined aggregation function and to normalize the identified quality-aspect-related quality assessment to the identified assessment coverage factor for the outputting of an assessment coverage of the quality-aspect-related quality assessment.

In a further embodiment, the normalization mechanism is further embodied to output a multi-quality-aspect-encompassing assessment of the software code based on the aggregated assessed rule infringements.

In a further embodiment, the apparatus additionally comprises an effort-assessment mechanism, which is embodied to determine an effort required for the rectification of the assessed rule infringements based on predetermined rule properties and the identified object dimensions and to output effort-assessed corrective actions.

In a further embodiment, the apparatus additionally comprises a prioritization mechanism, which is embodied to sort the effort-assessed corrective actions according to the effort required and/or the severity of the rule infringement and to output a group of effort-assessed corrective actions based on predetermined target-achievement data.

In a further embodiment, the apparatus additionally comprises a selection mechanism, which is embodied to determine quality-assessment tasks, which are to be performed manually, based on the assessment coverage of the quality-aspect-related quality assessment and to output an updated assessment coverage taking into account the assessment effort for the identified quality-assessment tasks.

In a further embodiment, the selection mechanism is embodied, during the determination of the quality-assessment tasks to be performed manually, only to take into account the quality-assessment tasks, which are to be performed on software code objects that have changed in comparison with already quality-assessed software code objects.

BRIEF DESCRIPTION OF THE DRAWINGS

Exemplary embodiments will be explained in more detail below based on the schematic drawings, wherein.

DETAILED DESCRIPTION

Figure 1:
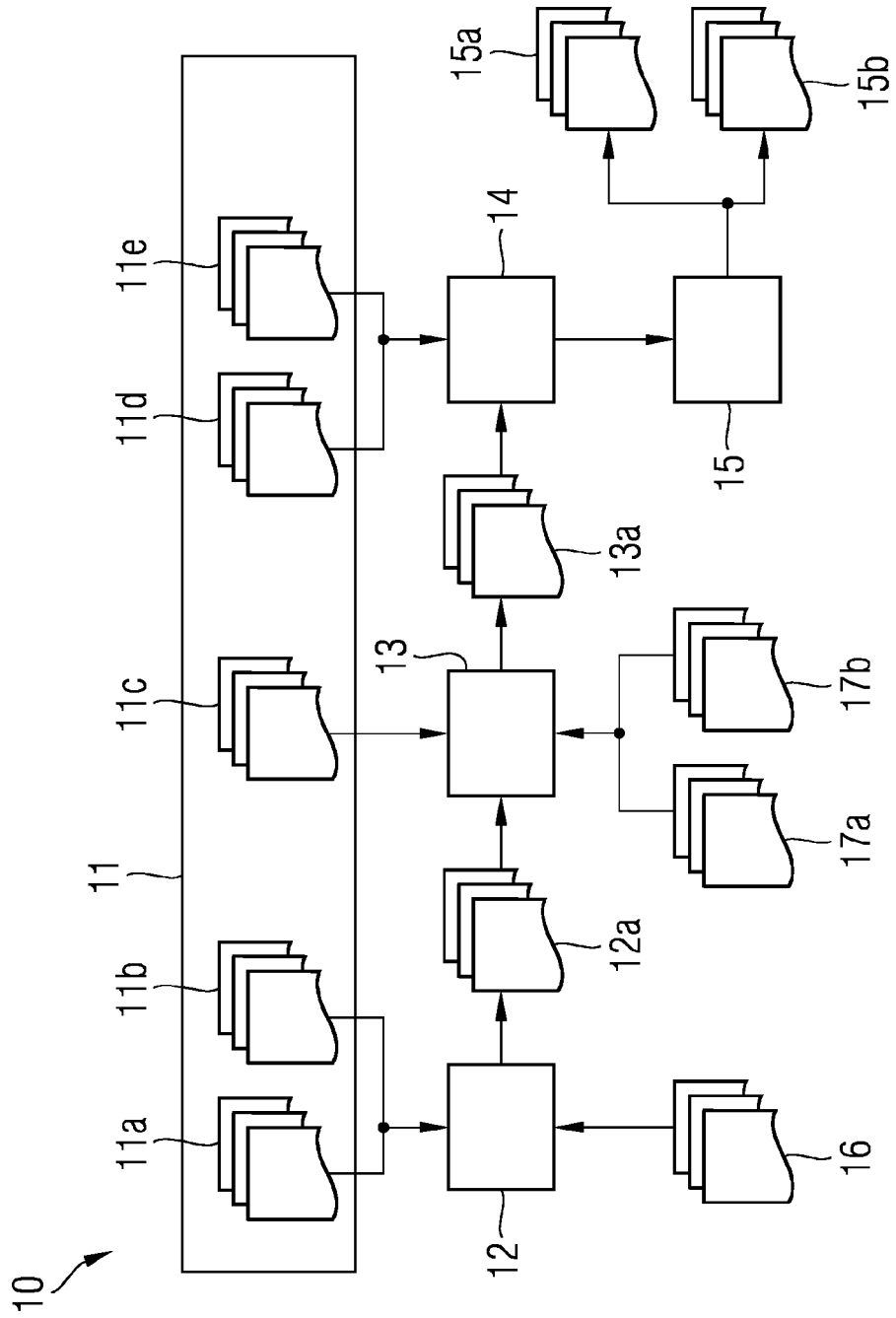
FIG. 1 is a schematic representation of an apparatus for the determination of an assessment coverage of a quality assessment of a software code according to one embodiment.
Figure 2:
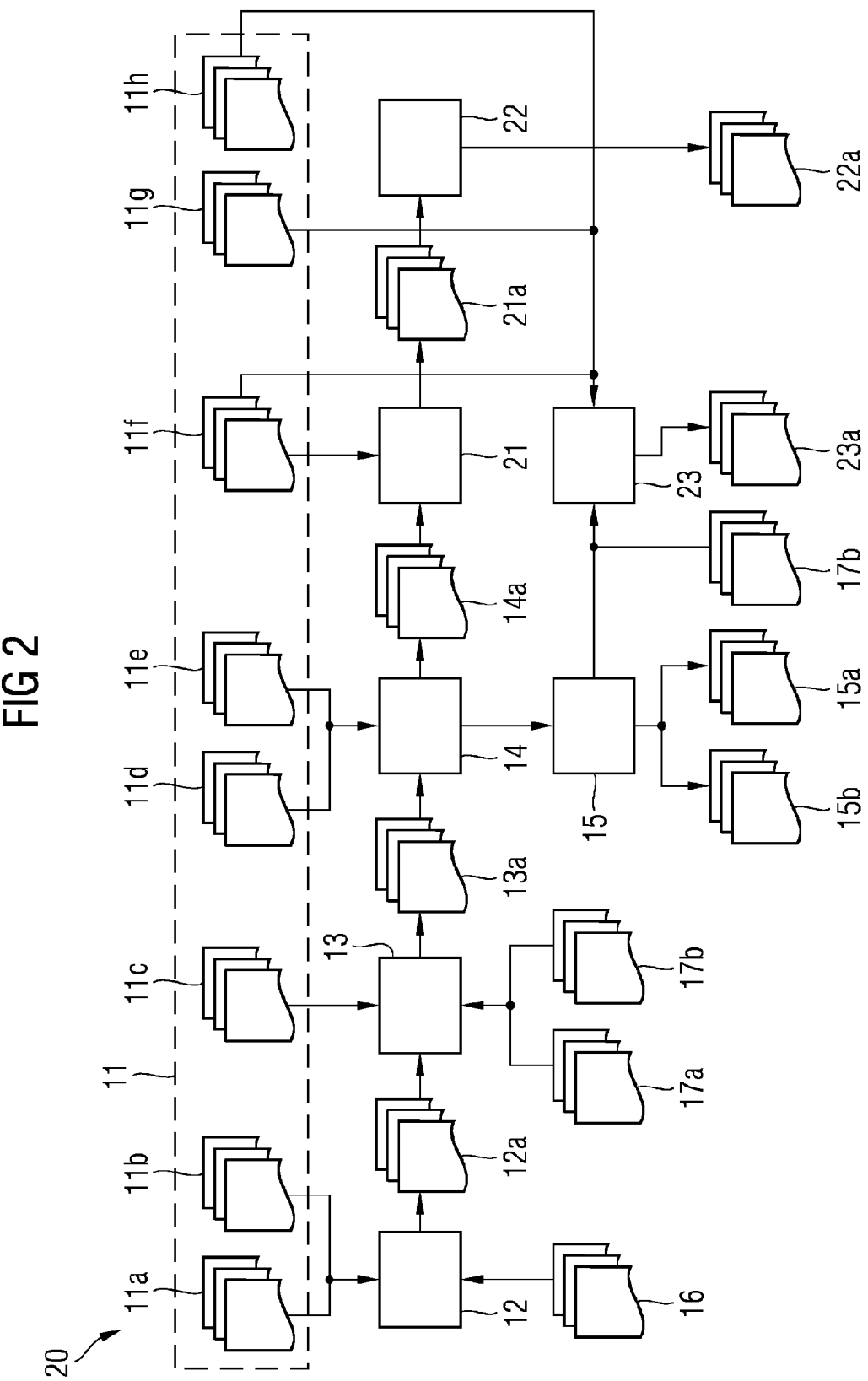
FIG. 2 is a schematic representation of an apparatus for the determination of an assessment coverage of a quality assessment of a software code according to a further embodiment.

Certain embodiments of the present disclosure perform a fully automatic source-code evaluation based on expanded quality models. In this context, based on the results of a static code analysis, predetermined aggregation functions are used which enable the determination of the degree to which the static code analysis covers all aspects of the quality assessment of the software code. This enables conclusions to be drawn from the relative results of static code analysis regarding the absolute information or coverage content of the quality assessment.

Therefore, one embodiment provides a method for the determination of an assessment coverage of a quality assessment of a software code, with the steps of the performance of a static code analysis of the software code with the aid of predetermined rule and/or metric definitions and outputting identified rule infringements and/or object dimensions, of the assessment of the identified rule infringements and/or object dimensions based on predetermined assessment functions and outputting assessed rule infringements, of the aggregation of the assessed rule infringements based on a predetermined quality aspect hierarchy and outputting a quality-aspect-related quality assessment of the software code and of the determination of a quality-aspect-related assessment coverage factor based on a predetermined aggregation function and normalization of the identified quality-aspect-related quality assessment to the identified assessment coverage factor for outputting an assessment coverage of the quality-aspect-related quality assessment.

According to one embodiment, the method can comprise the steps of outputting a multi-quality-aspect-encompassing quality assessment of the software code based on the aggregated assessed rule infringements.

According to one embodiment, the method can comprise the steps of the assessment of an effort required for the rectification of the assessed rule infringements based on predetermined rule properties and the identified object dimensions and of outputting effort-assessed corrective actions.

According to one embodiment, the method can comprise the steps of sorting the effort-assessed corrective actions according to the effort required and/or severity of the rule infringement and of outputting a group of effort-assessed corrective actions based on predetermined target-achievement data.

The outputting of assessed rule infringements can comprise an outputting of assessed rule infringements by software code objects that have changed in comparison with already quality-assessed software code objects.

According to one embodiment, the method can comprise the steps of the determination of quality-assessment tasks, which are to be performed manually, based on the assessment coverage of the quality-aspect-related quality assessment and of the outputting of an updated assessment coverage taking into account the assessment effort for the identified quality-assessment tasks.

In this context, it can be provided that only those quality-assessment tasks are taken into account which are to be performed on software code objects that have changed in comparison with already quality-assessed software-code objects.

Other embodiments provide an apparatus for the determination of an assessment coverage of a quality assessment of a software code. The apparatus comprises a database mechanism, which is embodied to store predetermined rule and/or metric definitions, predetermined assessment functions, predetermined quality aspect hierarchies, predetermined aggregation functions and predetermined rule properties for a plurality of software codes. The apparatus further comprises an analyzer mechanism, which is embodied to perform a static code analysis of the software code with the aid of predetermined rule and/or metric definitions from the database mechanism and to output identified rule infringements and/or object dimensions. The apparatus further comprises an evaluation mechanism, which is embodied to assess the identified rule infringements and/or object dimensions based on predetermined assessment functions from the database mechanism and output assessed rule infringements. The apparatus further comprises an aggregation mechanism, which is embodied to aggregate the assessed rule infringements based on a predetermined quality aspect hierarchy from the database mechanism and output a quality-aspect-related quality assessment of the software code. The apparatus further comprises a normalization mechanism, which is embodied to determine a quality-aspect-related assessment coverage factor based on a predetermined aggregation function and normalize the identified quality-aspect-related quality assessment to the identified assessment coverage factor for the outputting of an assessment coverage of the quality-aspect-related quality assessment.

According to one embodiment, the normalization mechanism can further be embodied to output a multi-quality-aspect-encompassing quality assessment of the software code based on the aggregated assessed rule infringements.

According to one embodiment, the apparatus can further comprise an effort-assessment mechanism, which is embodied to determine an effort required for the rectification of the assessed rule infringements based on predetermined rule properties and the identified object dimensions and output effort-assessed corrective actions.

According to one embodiment, the apparatus can further comprise a prioritization mechanism, which is embodied to sort the effort-assessed corrective actions according to the effort required and/or severity of the rule infringement and output a group of effort-assessed corrective actions based on predetermined target-achievement data.

According to one embodiment, the evaluation mechanism can be embodied to output assessed rule infringements of already quality-assessed changed software-code objects.

According to one embodiment, the apparatus can also comprise a selection mechanism, which is embodied to determine quality-assessment tasks which are to be performed manually based on the assessment coverage of the quality-aspect-related quality assessment and to output an updated assessment coverage taking into account the assessment effort for the identified quality-assessment tasks.

In this context, the selection mechanism can be embodied to take into account during the determination of the quality-assessment tasks to be performed manually, only the quality-assessment tasks which are to be performed on software code objects that have changed in comparison with software code objects already quality-assessed in a previous method.

The above embodiments and developments can, insofar as is meaningful, be combined with each other in any suitable manner. Further possible embodiments, developments and implementations include combinations, not explicitly cited, of features described herein with respect to various features of the embodiments.

A source code within the meaning of this disclosure can be any program code written in a programming language which, following compilation, results in executable software. In this context, the source code can be written in any programming language, for example C/C++, C#, Java or similar programming languages. It is also possible for the source code to be present as an intermediate code, as for example, in Java, .NET or a similar format.

FIG. 1 shows a schematic representation of an apparatus 10 for the determination of an assessment coverage of a quality assessment of a software code. The apparatus 10 comprises a database mechanism 11, an analyzer mechanism 12, an evaluation mechanism 13, an aggregation mechanism 14 and a normalization mechanism 15.

Figure 3:
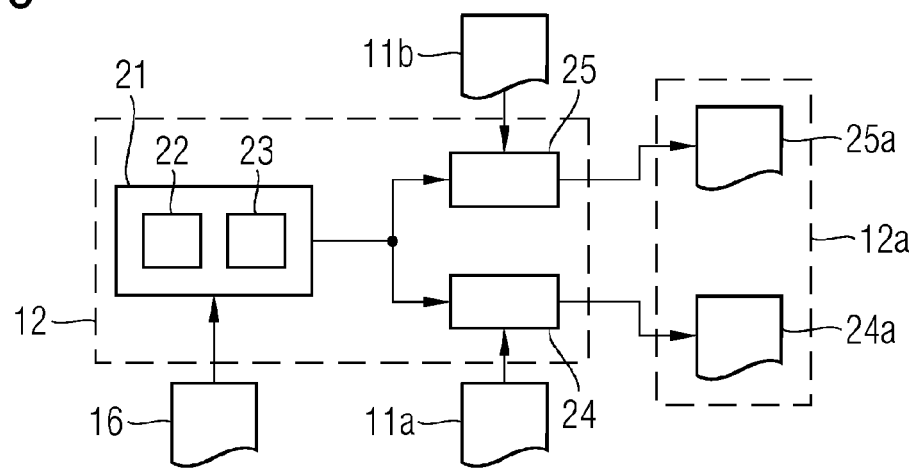
FIG. 3 is a schematic representation of a mode of operation of an analyzer mechanism according to a further embodiment.
Figure 4:
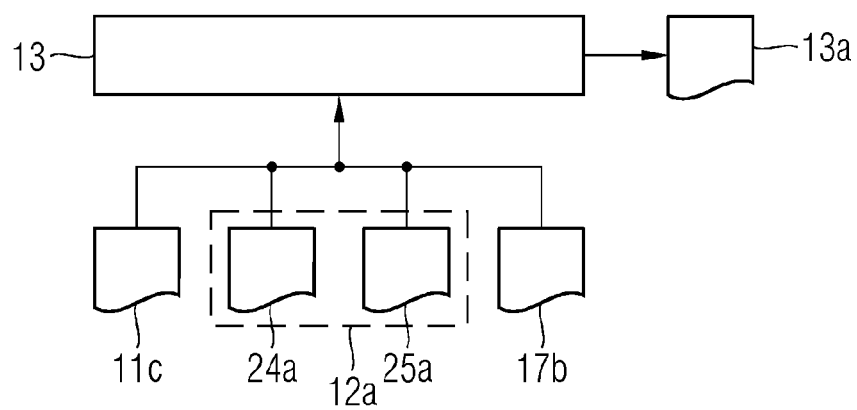
FIG. 4 is a schematic representation of a mode of operation of an evaluation mechanism according to a further embodiment.
Figure 5:
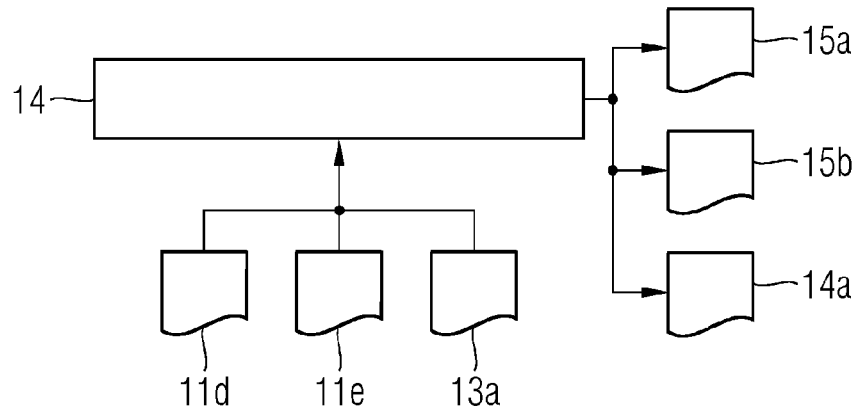
FIG. 5 is a schematic representation of a mode of operation of an aggregation mechanism according to a further embodiment.

The following explains the functions and modes of operation of the individual components of the apparatus 10 with respect to the depictions in FIGS. 3 to 5, which, for purposes of better understanding, show detailed depictions of the analyzer mechanism 12, the evaluation mechanism 13 and the aggregation mechanism 14.

As shown in FIG. 3, the analyzer mechanism 12 comprises a static code analyzer 21, which can comprise a scanner 22 and a parser 23. The static code analyzer accepts a source code 16, which can be processed in the scanner 22 and/or the parser 23 so that after parsing by the parser 23 code objects are available to which an automatic static code analysis can be applied.

To this end, the analyzer mechanism 12 can comprise a metric-calculating device 25 and a rule-evaluating device 24. In addition to the code objects from the source code 16 parsed by the parser 23, the metric-calculating device 25 receives as input parameters predetermined metric definitions 11b. In the metric-calculating device 25, the predetermined metric definitions 11b can be applied to the code objects in order to receive object dimensions 25a as the output. The object dimensions 25a can in this context in particular comprise results of the metrics for software objects, for example the number of code lines, the number of object linkages, the frequency of executed loops or similar metrics results. In this context, the metrics are not defined as specific metrics and it is possible for any metric definitions 11b to be predetermined and evaluated with the metric-calculating device 25.

The analyzer mechanism 12 can also comprise a rule-evaluating device 24, which receives a predetermined rule definition 11a as an input parameter and based on the code objects from the source code parsed by the parser 23 compiles rule infringements 24a. In this context, the rule infringements 24a can be present as an unsorted and unweighted list, which only lists rule infringements 24a determined with reference to the predefined rule definitions 11a.

The rule infringements 24a and the object dimensions 25a can be further used as output values 12a of the analyzer mechanism 12 by the apparatus 10. For the static code analysis in the analyzer mechanism 12, it is possible, for example, to use freely available tools such as, for example, FxCop, Gendarme, PMD, CheckStyle, sppcheck, SourceMonitor or commercial products such as, for example, Klocwork, Coverity, Sotograph, Understand or PC-Lint. However, obviously, it is also possible to use other tools for the static code analysis in the analyzer mechanism 12.

The predetermined rule definitions 11a and the predetermined metric definitions 11b can be filed in a database mechanism 11 of the apparatus 10, as shown in FIG. 1. To this end, the database mechanism 11 can comprise the rule definitions 11a and metric definitions 11b as part of a predetermined quality model, which is used for the quality assessment of software codes.

The apparatus 10 further comprises an evaluation mechanism 13, as shown in FIG. 4. The evaluation mechanism 13 receives as input the rule infringements 24a and the object dimensions 25a. The evaluation mechanism 13 also receives one or more evaluation functions 11c from the database mechanism 11 based on which the evaluation mechanism 13 assesses the rule infringements 24a according to a prespecified assessment system. For example, it is possible to use a point system in order assign malus points to the rule infringements 24a depending upon the severity and/or influence. In this context, the object dimensions 25a, which can, for example, comprise an object list with metrics, can also be used in the assessment of the rule infringements. The evaluation mechanism 13 is designed to output a list with assessed rule infringements 13a, for example a list with rule infringements 13a to which an awarded score is assigned with the aid of the evaluation functions 11c.

The evaluation mechanism 13 can also receive as input manually assessed rules 17a and a list with changed software-code objects 17b, which can be included in the assessment. For example, manual assessments of rules or rule infringements can exert an influence on the assessed rule infringements 13a. It can also be possible for the evaluation mechanism 13 also to include rule infringements 24a as devalued in the assessment of the rule infringements if the manually assessed rules 17a relate to changed software-code objects 17b, i.e. to software-code objects 17b, which have been subject to changes in comparison to the original software code 16.

The apparatus 10 comprises an aggregation mechanism 14, as shown in FIG. 5. The aggregation mechanism 14 accepts the assessed rule infringements 13a from the evaluation mechanism 13 and groups them according to aspects of the quality model. To this end, the aggregation mechanism 14 can receive an aspect hierarchy 11d and an aggregation function 11e as input parameters from the database mechanism 11. The aggregation mechanism 14 can use the aggregation function 11e to determine for every aspect of the quality model according to the aspect hierarchy 11d the rule infringements 24a for which points are to be deducted according to the list of the assessed rule infringements 13a.

In this context, the aggregation mechanism 14 takes into account not only those components of an aspect of the aspect hierarchy 11d which can be automatically measured with the aid of metrics and/or rule definitions, but also the other components. In this way, in addition to the information on how high the quality of the software code 16 is assessed with respect to automatically measurable quality criteria according to the assessed rule infringements 13a, it is also possible to assess how high the assessment coverage of a particular quality aspect is. This means for example that, for a quality aspect, a total of 100 points can be issued, but the automatic quality measurement is only able to cover 40 points. In the above example, this results in an assessment coverage degree of 40%. If now, for example, due to point deductions by assessed rule infringements 13a, a score of 20 is determined by the aggregation mechanism 14, although a target achievement score of 50% is obtained for the achieved score with respect to the covered 40 points, a target achievement score of only 20% is achieved with respect to the overall possible score of 100.

It can for example be provided that, for a better overview, the aggregation mechanism 14 contains a scale of marks according to which, depending on the degree of points achieved, marks, like, for example, school marks, can be assigned. In the above example, the software code 16 in the selected aspect of the aspect hierarchy 11d would receive a school grade 4 for a point achievement degree of 50%. Since, however, the automatic code analysis can only cover 40% of the total possible number of points, a school grade of 6 would be obtained for a coverage-corrected grade of the selected aspect.

The aggregation mechanism 14 is designed to output the identified quality-aspect-related quality assessments according to a normalization mechanism 15, which in turn determines a quality-aspect-related assessment coverage factor based on the predetermined aggregation function 11e and normalizes the identified quality-aspect-related quality assessment to the identified assessment coverage factor for the outputting of an assessment coverage of the quality-aspect-related quality assessment. In this context, the assessment coverage comprises an aspect assessment 15a relating to each individual assessed aspect of the aspect hierarchy 11d and an overall marking 15b of all aspects of the quality model. On the evaluation of the markings 15a and 15b output by the normalization mechanism, it can be identified to what degree coverage gaps in the assessment coverage have occurred in the automatic code analysis. At the same time, the result is corrected by the manually performed rule evaluations 17a and the corresponding corrections in changed software objects 17b.

The aggregation mechanism 14 can also output a list 14a of rule infringements, wherein details of how many points for the infringement have been deducted for which aspect of the aspect hierarchy 11d are stored in the list 14a for each rule infringement. This makes it possible to identify the proportion of rule infringements both for each individual aspect and for the overall marking.

Figure 6:
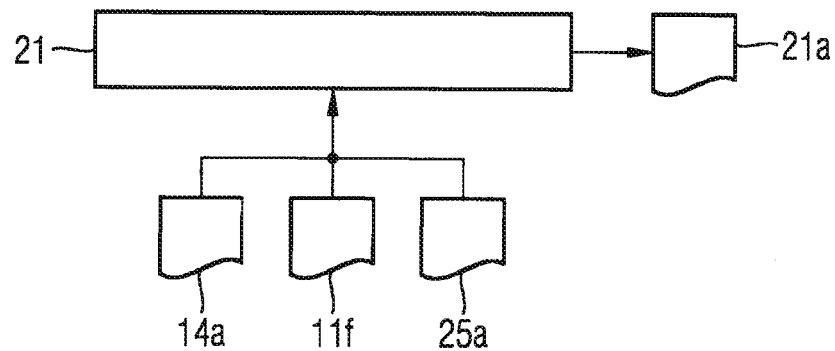
FIG. 6 is a schematic representation of a mode of operation of an effort-assessment mechanism according to a further embodiment.

The list 14a of rule infringements can be forwarded according to an effort-assessment mechanism 21, which is embodied to determine an effort required for the rectification of the assessed rule infringements 13a based on predetermined rule properties 11f and the identified object dimensions 25a, as shown in FIG. 6. It can be provided that the effort-assessment mechanism 21 receives the rule properties 11f as input parameters from the database mechanism 11. With reference to the object dimensions 25a, this enables the assessment of an effort which will probably be required for the rectification of a rule infringement. For example, it is possible to file as a rule property for each rule infringement details of whether the rectification of the rule infringement necessitates local, module-wide or system-wide changes to the software code 16. In the case of a local change to the software code 16, it is possible, for example, to use the number of locally affected code lines, as determined according to the object dimensions 25a, for the calculation of effort.

For example, a local rule infringement can be assessed with a constant for effort, a module-wide rule infringement with a value in dependence on size of the module and a system-wide rule infringement in dependence on the size and number of the modules used. The effort-assessment mechanism 21 can be embodied to output effort-assessed corrective actions 21a.

Figure 7:
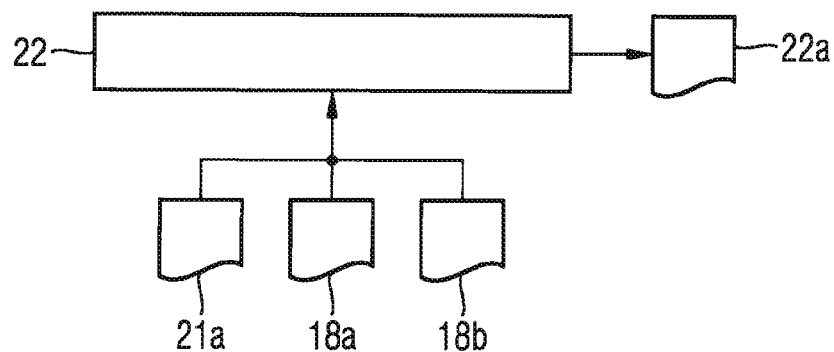
FIG. 7 is a schematic representation of a mode of operation of a prioritization mechanism according to a further embodiment.

As shown in FIG. 7, the effort-assessed corrective actions 21a can be passed to a prioritization mechanism 22, which is embodied to sort the corrective actions according to their severity. This enables the probable effort identified for each corrective action to be taken into account. The purpose of the prioritization mechanism 22 is to prioritize corrective actions which promise the highest benefit with the lowest effort higher than corrective actions promise a lower benefit or a require a greater effort. To this end, the prioritization mechanism 22 can receive as input parameters effort threshold values 18a and quality threshold values 18b. The effort threshold values 18a and the quality threshold values 18b are project-related target-achievement data which disclose criteria for the maximal possible effort to be exerted or minimum quality desired. For example, the effort threshold can be achieved if the effort available in terms of costs or time is used up by the corrective actions to be performed. The quality threshold can be achieved if the performance of the corrective actions causes the quality assessment to rise over a certain predetermined amount.

The prioritization mechanism 22 can be embodied to generate as output a sorted list 22a of suggested corrective actions to be performed.

Figure 8:
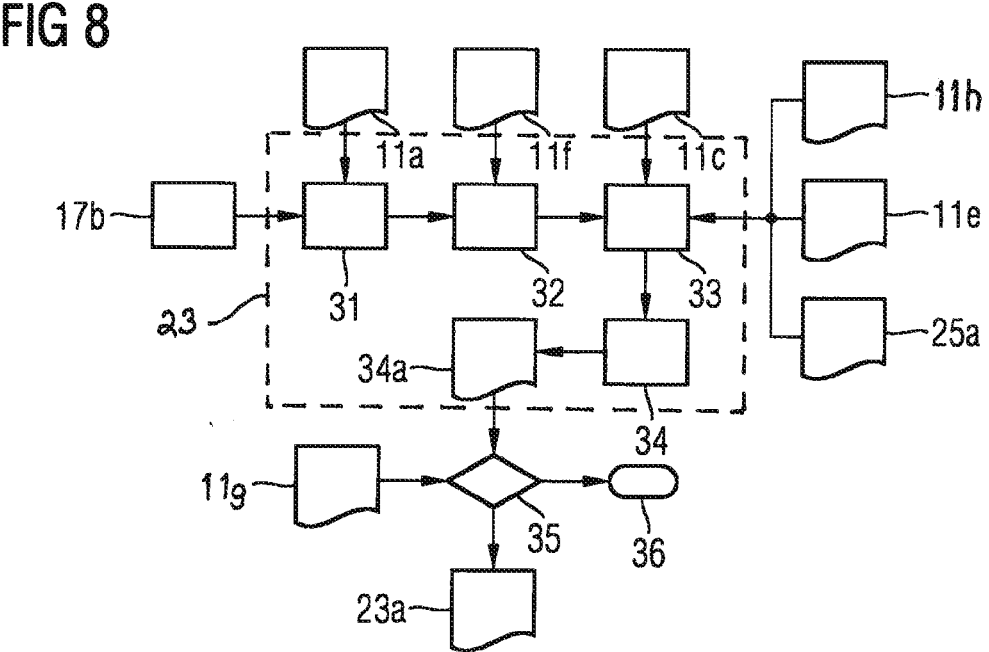
FIG. 8 is a schematic representation of a mode of operation of a selection mechanism according to a further embodiment.

The apparatus 10 can also comprise a selection mechanism 23, which can be embodied to determine, quality-assessment tasks, which are to be performed manually, based on the assessment coverage of the quality-aspect-related quality assessment and to output an updated assessment coverage taking into account the assessment effort for the identified quality-assessment tasks. To this end, as shown in the diagram illustrating the mode of operation of the selection mechanism 23 in FIG. 8, the selection mechanism 23, can receive as input changed software-code objects 11b. In a method step 31, the selection mechanism 23 selects the assessment tasks that have to be performed manually for each object type in order to achieve the required assessment coverage. Here, the rule definitions 11a of the quality model can be taken into account as a basis.

With reference to the rule properties 11f, in a step 32, following the assessment tasks to be performed manually, an effort can be calculated, which will probably be necessary for the assessment tasks to be performed manually. Then, taking into account the aspect assessment with the effort estimation 11h, the aggregation functions 11e and the object dimensions 25a, the evaluation function 11c can be used to calculate an effort coverage coefficient in a step 33 which indicates the amount of additional effort with which a corresponding assessment coverage can be increased.

All the suggested assessment tasks to be performed manually are sorted in a step 34 in order to generate a list 34a with assessment tasks to be sorted manually, i.e. a list 34a indicating which assessment tasks to be performed manually promise the highest increase in assessment coverage for the least effort.

If in step 35, it should be identified during a comparison with project-related target coverage specifications 11g that the present assessment coverage does not correspond to the target coverage specifications 11g, a certain number 23a of manual assessment tasks to be performed according to the sorted list 34a can be suggested to increase the assessment coverage. However, if the target coverage has already been reached, the selection mechanism 23 can stop its work in a step 36.

In some embodiments, the selection mechanism 23 only uses assessment-neutral criteria such as the assessment coverage and assessment effort to be achieved in order to influence a subsequent manual assessment as little as possible.

What is claimed is:

1. A method for determining a quality assessment of a software code and the assessment coverage, comprising:
   performing a static code analysis of the software code with the aid of predetermined rule and/or metric definitions and outputting identified rule infringements and object dimensions, which include results of the metrics for software objects;
   assessing the identified rule infringements and object dimensions based on predetermined assessment functions and outputting assessed rule infringements;
   aggregating the assessed rule infringements based on a predetermined quality aspect hierarchy and outputting a quality-aspect-related quality assessment of the software code;
   determining a quality-aspect-related assessment coverage factor based on a predetermined aggregation function and normalization of the identified quality-aspect-related quality assessment to the identified assessment coverage factor and outputting an assessment coverage of the quality-aspect-related quality assessment;
   identifying a subset of software code objects that have changed in comparison with software code objects already previously determined in the quality assessment;
   only for the identified subset of changed software code objects, determining quality-assessment tasks to be performed manually for the identified subset of changed software code objects, based on the assessment coverage of the quality-aspect-related quality assessment; and
   outputting an updated assessment coverage taking into account the assessment effort for the determined quality-assessment tasks.

2. The method of claim 1, further comprising:
   outputting a multi-quality-aspect-encompassing quality assessment of the software code based on the aggregated assessed rule infringements.

3. The method of claim 1, further comprising:
   assessment of an effort required for the rectification of the assessed rule infringements based on predetermined rule properties and the identified object dimensions; and
   outputting effort-assessed corrective actions.

4. The method of claim 3, further comprising:
   sorting the effort-assessed corrective actions according to the amount of effort required and/or severity of the rule infringement; and
   outputting a group of effort-assessed corrective actions based on predetermined target-achievement data.

5. The method of claim 1, wherein the outputting of assessed rule infringements includes the outputting of assessed rule infringements by software code objects that have changed in comparison with already quality-assessed software code objects.

6. A system for determining a quality assessment of a software code and the assessment coverage, comprising:
   a processor, and
   a non-transitory, computer readable memory comprising instructions programmed to:
   perform a static code analysis of the software code with the aid of predetermined rule and/or metric definitions and outputting identified rule infringements and object dimensions, which include results of the metrics for software objects;
   assess the identified rule infringements and object dimensions based on predetermined assessment functions and outputting assessed rule infringements;
   aggregate the assessed rule infringements based on a predetermined quality aspect hierarchy and outputting a quality-aspect-related quality assessment of the software code;
   identify a subset of software code objects that have changed in comparison with software code objects already previously determined in the quality assessment;
   only for the identified subset of changed software code objects, determining quality-assessment tasks to be performed manually for the identified subset of changed software code objects, based on the assessment coverage of the quality-aspect-related quality assessment; and
   output an updated assessment coverage taking into account the assessment effort for the determined quality-assessment tasks.

7. The system of claim 6, further comprising instructions programmed to:
   output a multi-quality-aspect-encompassing quality assessment of the software code based on the aggregated assessed rule infringements.

8. The system of claim 6, further comprising instructions programmed to:
   assessment of an effort required for the rectification of the assessed rule infringements based on predetermined rule properties and the identified object dimensions; and
   output effort-assessed corrective actions.

9. The system of claim 8, further comprising instructions programmed to:
   sort the effort-assessed corrective actions according to the amount of effort required and/or severity of the rule infringement; and
   output a group of effort-assessed corrective actions based on predetermined target-achievement data.

10. The system of claim 6, wherein the instructions programmed to output assessed rule infringements output assessed rule infringements by software code objects that have changed in comparison with already quality-assessed software objects.

* * * * *